(12) United States Patent
Trower, II et al.

(10) Patent No.: US 7,171,353 B2
(45) Date of Patent: *Jan. 30, 2007

(54) GRAMMAR-BASED AUTOMATIC DATA COMPLETION AND SUGGESTION FOR USER INPUT

(75) Inventors: Tandy Woodson Trower, II, Woodinville, WA (US); Mark J. Weinberg, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 299 days.

This patent is subject to a terminal disclaimer.

(21) Appl. No.: 10/956,287

(22) Filed: Oct. 1, 2004

(65) Prior Publication Data

US 2005/0043942 A1  Feb. 24, 2005

Related U.S. Application Data

(63) Continuation of application No. 09/519,942, filed on Mar. 7, 2000, now Pat. No. 6,922,810.

(51) Int. Cl.
*G06F 17/27* (2006.01)

(52) U.S. Cl. ............................................ 704/9; 715/534
(58) Field of Classification Search ............... None
See application file for complete search history.

(56) References Cited

U.S. PATENT DOCUMENTS

| | | |
|---|---|---|
| 4,969,097 A | 11/1990 | Levin |
| 5,305,205 A | 4/1994 | Weber et al. |
| 5,390,279 A | 2/1995 | Strong |
| 5,621,641 A | 4/1997 | Freeman |
| 5,640,501 A | 6/1997 | Turpin |
| 5,664,896 A | 9/1997 | Blumberg |
| 5,715,469 A | 2/1998 | Arning |
| 5,734,749 A | 3/1998 | Yamada et al. |
| 5,835,087 A | 11/1998 | Herz et al. |
| 5,845,300 A | 12/1998 | Comer et al. |
| 5,896,321 A | 4/1999 | Miller et al. |
| 5,963,666 A | 10/1999 | Fujisaki et al. |
| 6,016,467 A | 1/2000 | Newsted et al. |
| 6,208,339 B1 | 3/2001 | Atlas et al. |
| 6,377,965 B1 | 4/2002 | Hachamovitch et al. |
| 6,539,421 B1 | 3/2003 | Appelman et al. |
| 6,618,697 B1 | 9/2003 | Kantrowitz et al. |
| 7,003,446 B2 * | 2/2006 | Trower et al. ............. 704/9 |

OTHER PUBLICATIONS

Finnie, Scott, "Test Drive: Internet Explorer 5.0" 1998 Windows Magazine Feb. 1999, 4 pages.
Friedman, Will et al., "Collect Demographic Data More Easily with Internet Explorer 5," Site-Builder Magazine, 2000 Microsoft Corporation, 3 pages.
"Getting the Most from IE5.0: Honing Your Searches" 2000, Microsoft Corporation, Dec. 3, 1998, 2 pages.

* cited by examiner

*Primary Examiner*—Susan McFadden
(74) *Attorney, Agent, or Firm*—Lee & Hayes, PLLC

(57) ABSTRACT

In a computer, a user interface allows users to input requests to various applications or software modules executing on the computer. During the input process, the invention presents to the user a grammar-based automatic completion of the user input so far, and/or a grammar-based suggestion list of one or more possible options for completing the user input.

32 Claims, 4 Drawing Sheets

GRAMMAR-BASED AUTOMATIC DATA COMPLETION AND SUGGESTION FOR USER INPUT

RELATED APPLICATIONS

This is a continuation of application Ser. No. 09/519,942, filed Mar. 7, 2000 now U.S. Pat. No. 6,922,810, entitled "Grammar-Based Automatic Data Completion and Suggestion for User Input", which is hereby incorporated by reference herein.

TECHNICAL FIELD

This invention relates to user interfaces for computers. More particularly, the invention relates to grammar-based automatic data completion and suggestion for user input.

BACKGROUND OF THE INVENTION

The advent of computers and their continued technological advancement has revolutionized the manner in which people work and live. One factor that has driven this revolution, by increasing people's willingness and desire to use computers, is an improvement in the ease of use or "user-friendliness" of computers.

Although computers have become more user-friendly over the years, situations still arise where their user-friendliness can be improved. For example, situations still exist where the user can input "free form" data into a computer without being informed as to what are valid input options for the data, such as by typing a command to the computer into an edit control of a graphical user interface. In typical computer systems, however, the user receives no feedback from the computer during his or her data entry regarding whether his or her input is valid or acceptable to the computer.

Additional problems with user-friendliness result from the amount of data (e.g., characters or words) that a user has to provide in order to input a command or request to the computer. Requiring a user to repeatedly enter long character or word strings for a command detracts from the user-friendliness of the computer system.

One solution to these problems is to maintain a history of previous command or data entries by the user. These can be compared, character by character, against new entries by the user, and a matching entry or entries displayed to the user. This solution, however, merely provides the user with an indication of what he or she has done before—there is no indication to the user of what possible entries are available.

Another solution to these problems is to identify all of the data entry possibilities to the user. However, given the large number of possibilities that can exist, this solution can quickly overwhelm the user and is only exacerbated as new entry possibilities are created.

The invention described below addresses these disadvantages, providing grammar-based automatic data completion and suggestion for user input.

SUMMARY OF THE INVENTION

In a computer, a user interface allows users to input requests to various applications or software modules executing on the computer. The invention presents to the user a grammar-based automatic completion of a user input and/or a grammar-based suggestion list of one or more possible options for completing the user input.

According to one aspect of the invention, a partial data input is received from a user. The partial data input is compared to a context free grammar to determine which grammar rules (if any) match the partial data input. These grammar rules can optionally include various wildcards and/or variables. A score is generated for each of the matching grammar rules, the score for a rule identifying how well that rule matches the partial data input.

According to another aspect of the invention, a grammar rule having the highest score is presented to the user as an automatic completion option for the data input.

According to another aspect of the invention, a set of grammar rules having scores that exceed a threshold value are presented to the user as suggested options for completing the data input.

According to another aspect of the invention, auto completion and/or suggestion options are identified only after there is a pause in the user input. According to this aspect of the invention, the invention waits for a longer pause when the user is engaged in deleting characters from the data entry than when the user is engaged in adding characters to the data entry.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, embodiments of the invention can be implemented using one or more application specific integrated circuits (ASICs).

Figure 1:
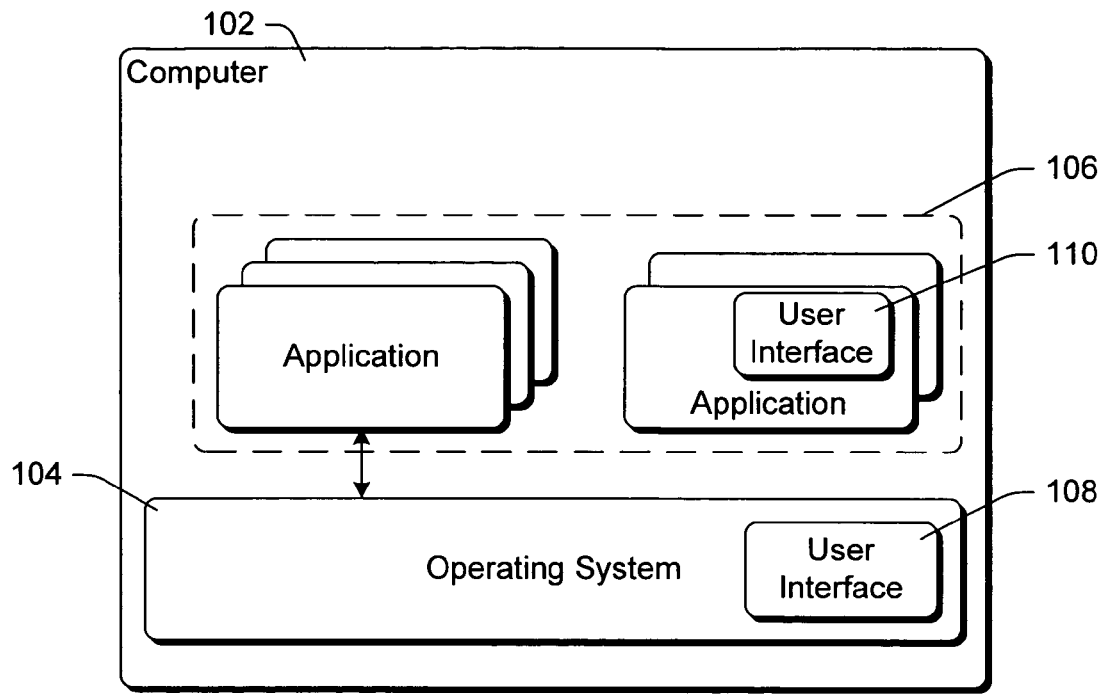
FIG. 1 illustrates an exemplary software environment in which the invention can be practiced.

FIG. 1 illustrates an exemplary software environment in which one embodiment of the invention can be practiced. A computer 102 includes an operating system 104 and one or more applications 106 that are executed by operating system 104. Operating system 104 represents any of a wide variety of operating systems, such as those in the Microsoft WINDOWS family of operating systems available from Microsoft Corporation of Redmond, Wash. Applications 106 represent any of a wide variety of conventional software applications, including recreational, educational, productivity/business, utility, etc. applications. Applications 106 and operating system 104 are both made up of one or more software modules including instructions to carry out their various functions.

Operating system 104 includes a user interface module 108 that manages presentation of the user interface to a user of computer 102, allowing the user to interact with operating system 104. Different user interfaces can be provided by computer 102, either individually or in combination. Examples of such interfaces include a graphical user interface (GUI), a command-line interface to receive keyboard inputs, a speech or handwriting interface, etc. Users can interact with applications 106 via user interface module 108, or alternatively via a separate user interface module provided by an application, such as user interface module 110. Modules 108 and/or 110 present to the user an "edit control". As used herein, "edit control" refers to any component (e.g., a software component) that receives input. For example, a box or command line into which text can be typed, a sound recorder that receives speech input, a pattern recognizer that receives handwriting input, etc. The exact nature of the edit control is dependent on the nature of the data being input (e.g., typing, speech, handwriting, etc.). Commands or requests directed to an application 106 or operating system 104 can be input by the user via such an edit control.

Embodiments of the invention can be implemented in, or alternatively operate in conjunction with, a user interface module 108 or 110. The invention receives partial data inputs as the user is entering data via the interface module 108 or 110. The invention determines a set of likely options for completing the data input and presents these options to the user. The set of likely options is based on the partial data inputs as well as one or more of a set(s) of grammar rules, data entry history, the user context, and a scoring process.

Figure 2:
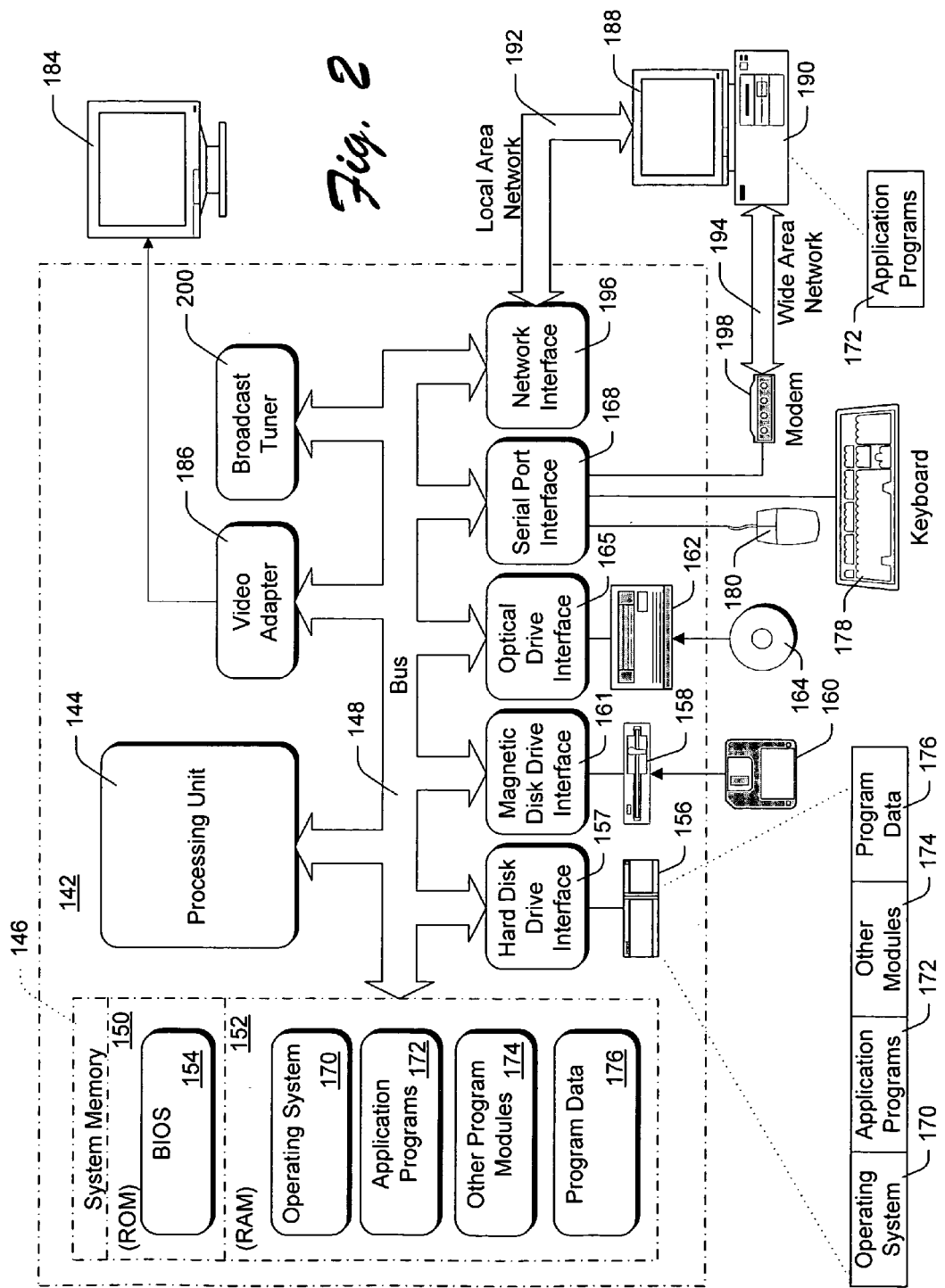
FIG. 2 shows a general example of a computer that can be used in accordance with the invention.

FIG. 2 shows a general example of a computer 142 that can be used in accordance with one embodiment of the invention. Computer 142 is shown as an example of a computer that can perform the functions of computer 102 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 (e.g., a serial port interface) that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 can optionally operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 can also optionally include one or more broadcast tuners 200. Broadcast tuner 200 receives broadcast signals either directly (e.g., analog or digital cable transmissions fed directly into tuner 200) or via a reception device (e.g., via an antenna or satellite dish (not shown)).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
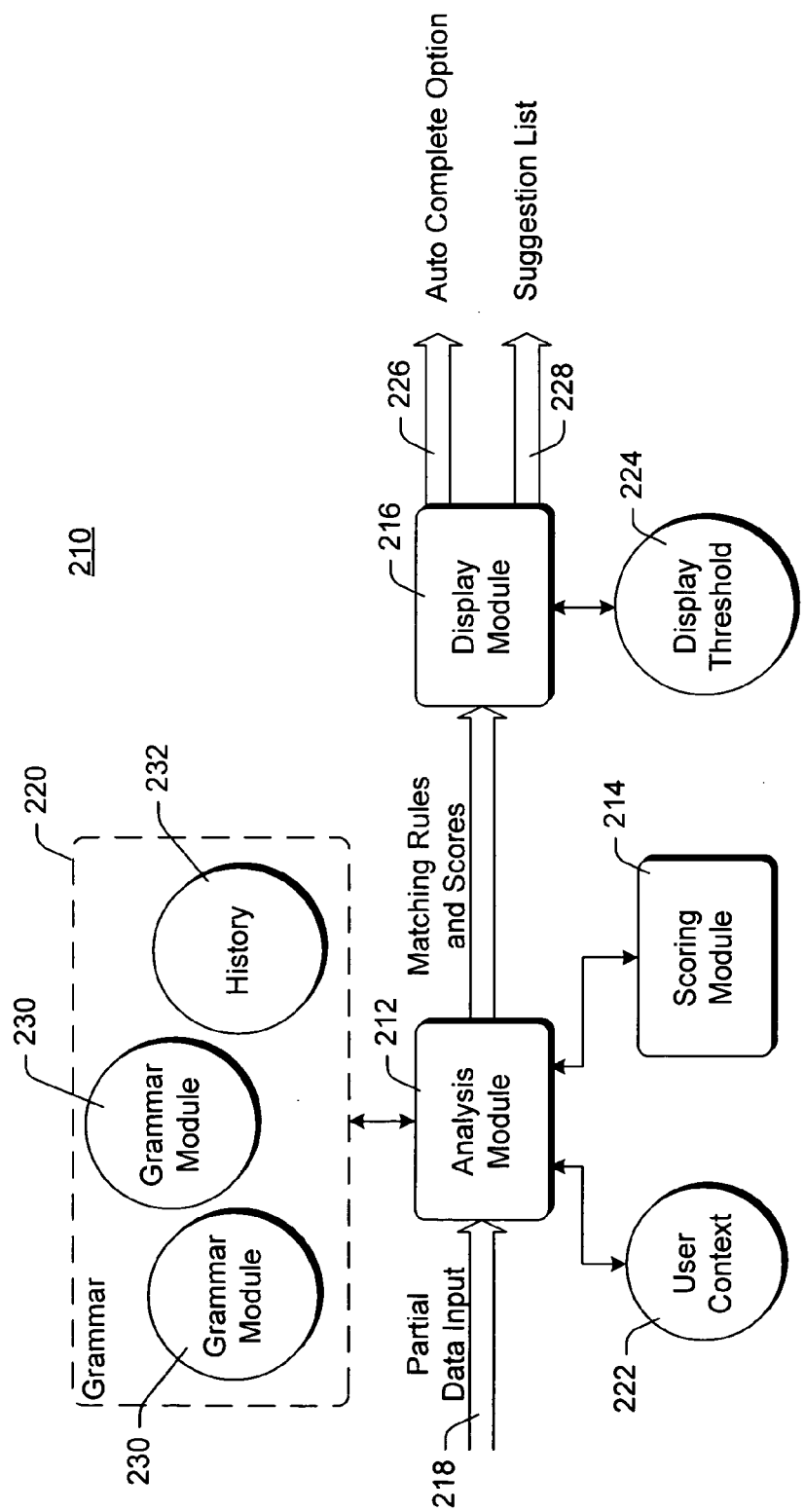
FIG. 3 is a block diagram illustrating a system for automatic data input completion and suggestion according to one embodiment of the invention.

FIG. 3 is a block diagram illustrating a system for automatic data input completion and suggestion according to one embodiment of the invention. The system 210 includes an analysis module 212, scoring module 214, and display module 216. Analysis module 212 receives partial data input 218, which is the user data input as the user is inputting the data. For example, if the user is typing in the data "what time is it?", analysis module 212 receives each character of the data ("w", followed by "h", followed by "a", etc.) as the character is input. Alternatively, rather than receiving the partial data input character by character, analysis module 212 may receive the total partial data input so far (e.g., "w", followed by "wh", followed by "wha", etc.).

Analysis module 212 compares the partial data input 218 to a context free grammar 220 to determine which grammar rules (if any), the partial data input 218 matches. A context free grammar is a set of characters (e.g., letters, numbers, symbols, and/or combinations thereof) and accompanying rules for combining the symbols. Analysis module 212 further uses a scoring module 214 to provide a rank or score for each of the matching grammar rules, the rank or score identifying how well each of the matching grammar rules matches the partial data input 218.

Analysis module 212 and/or scoring module 214 may also make use of user context information 222. The user context information 222 provides information about what the user is currently doing in system 210 or what the user has previously done in system 210 (or another system). User context information 222 may identify, for example: which application 106 of FIG. 1 is the currently "active" application; which commands have previously been entered by the user and their frequency of entry; which previous completion options have been accepted by the user and their frequency of acceptance; preferences that have been entered by the user (e.g., favorite applications, commonly used commands, etc.); the last command entered by the user; the current platform being operated on (e.g., a desktop computer, a portable computer, a wireless computer or cell phone, etc.); the current location of an on-screen pointer; the current time, date, and/or day of the week; etc. User context information can be based on activity at system 210 or alternatively another system (e.g., a record of which previous completion options have been accepted by the user at another system can be transferred to system 210).

Analysis module 212 forwards the matching grammar rules and their corresponding scores to display module 216, which determines a most likely completion option from the matching rules and a list of suggested completion options from the matching rules. Display module 216 selects the matching rule with the highest score for the auto completion option 226. Display module 216 uses a display threshold value 224 to determine which of the matching rules to provide as suggestion list 228. Matching rules with scores that exceed the display threshold value 224 are included as options in suggestion list 228, while scores that do not exceed the display threshold value 224 are not included as options in suggestion list 228. Display module 216 does not include in suggestion list 228 the highest scoring matching rule as that rule is listed as the auto completion option 226. Alternatively, display module 216 may include the highest scoring matching rule as an option in suggestion list 228.

The user can accept either the auto completion option 226 or one of the options from suggestion list 228 to complete his or her data entry. If the user accepts one of these options, the accepted option is forwarded to the corresponding software module for processing (i.e., to carry out the command or request).

Figure 4:
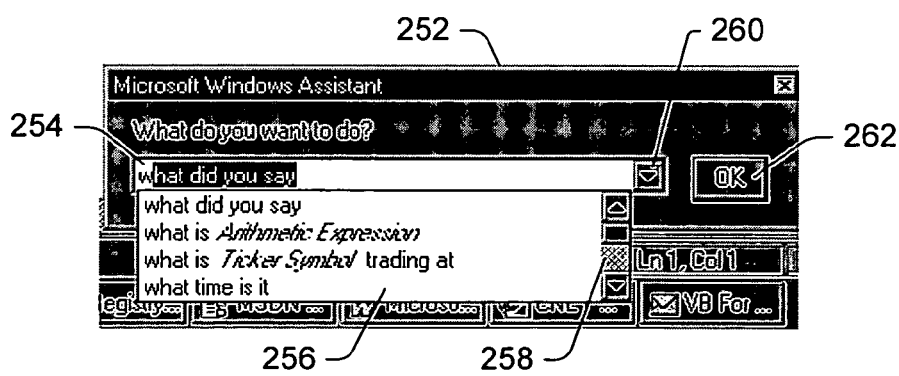
FIG. 4 illustrates a graphical user interface with auto completion and suggestion options according to one embodiment of the invention.

FIG. 4 illustrates a graphical user interface with auto completion and suggestion options according to one embodiment of the invention. A window 252 is illustrated along with an edit control 254 into which a user can type data (e.g., via a keyboard). As the user inputs data, an auto completion option is generated and fills in the remainder of edit control 254. The portion of edit control 254 that is auto completed is displayed in a different manner than that which has been entered by the user. In the illustrated example, the partial data input from the user is "w", and the rule "what did you say" has been identified as the closest matching rule. The data entry in the edit control is completed with the remainder of the rule, "hat did you say". The user can accept the remainder of the auto completion entry by, for example, selection of an "enter" key on a keyboard or the "ok" button 262.

A suggestion list 256 is also displayed that includes additional matching rules for the partial data input. A user can scroll through the multiple suggestion options in a conventional manner using scroll bar 258. Suggestion list 256 can be automatically displayed in window 252, or alternatively may be displayed only in response to user actuation of the pull-down or drop-down menu button 260. The entries in suggestion list 256 are displayed in alphabetical order. Alternatively, different ordering methodologies may be used, such as from highest score to lowest score.

The user may also accept one of the suggested options in suggestion list 256. An option from suggestion list 256 can be accepted by selecting that option. An option from list 256 can be selected in a variety of different manners, such as by highlighting an entry in list 256 using keyboard arrow keys or "page up" and "page down" keys, and then clicking a mouse button, hitting an "enter" key on a keyboard, etc. Alternatively, a user can select an option by using a pointing device (e.g., a mouse) to maneuver a pointer over the option and "clicking" on a selection button of the pointing device.

In addition to accepting the auto completion option or an option from suggestion list 256, a user can delete data from edit control 254. In the illustrated example, the auto completion data from the matching rule is highlighted and selected.

Thus, if the user actuates a "delete" or "backspace" key on a keyboard, or any other character input on the keyboard, then the auto completion data will be deleted (and replaced if another character is input).

Additionally, in one implementation a user can accept only a portion of the auto completion entry. This partial acceptance is performed using the "tab" key on a keyboard. Upon actuation of the "tab" key, display module 216 accepts either the remainder of the currently auto completed word or the next auto completed word. Thus, in the illustrated example of FIG. 4, if the user actuates the "tab" key then display module 216 will accept the remainder of the word "what". Such partially accepted words are made part of the partial data input and input to analysis module 212 of FIG. 3 as partial data input 218. Thus, in the illustrated example of FIG. 4, the user could easily accept the remainder of the word "what" and the word "did" by quickly actuating the "tab" key twice. If the user then pauses, analysis module 212 would perform its analysis using "what did" as the partial data input.

Returning to FIG. 3, data input 218 can be received from any of a wide variety of conventional data parsing modules (not shown). A data parsing module receives user input in any of a variety of manners, such as keyboard entry from a mechanical/physical keyboard or a graphical representation of a keyboard, speech input, handwriting input, etc. The data parsing module identifies the individual characters and/or character groups (e.g., words), of the user input and provides these characters or character groups to analysis module 212 as they are identified. Such data parsing modules are well-known to those skilled in the art and thus will not be discussed further except as they pertain to the invention.

Analysis module 212, as discussed above, analyzes the partial data inputs 218 to identify matches with the context free grammar rules 220. Analysis module 212 can initiate its analysis process immediately or alternatively after the user has paused in his or her data entry for a particular amount of time. The duration of the pause can optionally be based on whether the user is adding data or deleting data. For example, if the user is adding data (e.g., typing in new characters), then analysis module 212 may begin analyzing the partial data input 218 after the input is paused for a first time delay (e.g., in the range of 100 milliseconds to one second), referred to as the input time delay. However, if the user is deleting data, then analysis module 212 may begin analyzing the partial data input after the deletion is paused for a second time delay (referred to as the deletion time delay) which is typically longer than the first time delay (e.g., in the range of two seconds to five seconds).

Waiting for the input time delay while the user is adding characters prevents analysis module 212 from unnecessarily processing the partial data input. For example, the user may know exactly what he or she needs to enter as a valid input and may not desire any additional auto completion or suggestion options from the invention. Thus, by providing a constant stream of input without pauses greater than the input time delay, the user will not be presented with (and thus not distracted by) any auto completion or suggestion options.

Using a different, longer time delay when the user is deleting characters further enhances the user experience. For example, if a user types in a partial data entry and pauses, the auto completion option 226 is presented to the user. If the user then wants to change his or her input, the first actuation of the delete or backspace key will delete the presentation of the auto completion option 226. If the deletion time delay were not longer, then if the user did not continue his or her deletion quickly enough (prior to pausing for the input time delay), the same analysis would be performed and the same auto completion option 226 would be re-presented to the user.

Context free grammar 220 includes one or more grammar modules 230, each of which can include one or more grammar rules. Each software module (e.g., of applications 106 or operating system 104 of FIG. 1) can add one or more grammar modules 230 to context free grammar 220, allowing grammar 220 to be dynamically modified to suit the particular applications that execute on a particular computer.

Each software module can process one or more particular user requests. For example, a software module may be able to display the current time and the current date. A grammar module 230 is added to grammar 220 and includes multiple grammar rules that correspond to the user commands or requests that the corresponding software module can process. The author of the grammar rules (e.g., a designer of the corresponding software module) attempts to identify the possible different ways that a user may input his or her requests and add these different possibilities to the corresponding grammar module. Typically, a grammar module will include multiple different rules for each user command or request that the software module can process.

By way of example, a software module may be able to respond to a user request to display the current time. There are many different ways that a user may request that the current time be displayed, such as "what time is it?", "tell me the time", "what is the current time?", and "computer, what time is it?". The corresponding grammar module would include a different rule for each one of these.

In the illustrated example, a grammar rule matches a partial data input only if the characters in the partial data input are the same as the beginning of the rule (which may include variables, as discussed in more detail below). In alternative implementations, the ordering of the words in the rules and the partial data input are not important. The following examples illustrate the matching of a partial data input to grammar rules. Assume that the partial data input is "computer, please". The rules "computer, please open my inbox" and "computer, please delete the selected file" would both match because the words "computer" and "please" in the input are the same as "computer" and "please" in the beginning of the rule. However, the rule "delete the selected file" would not match because the first character of the input ("c") is not the same as the first character of the rule ("d"). The rule "please delete the selected file, computer" would also not match the input because the first character of the input ("c") is not the same as the first character of the rule ("p").

The grammar rules in grammar modules 230 can be written in any of a wide variety of manners, such as the well-known BNF (Backus-Naur Form) format. Letters, numbers, and symbols can all be used in grammar rules, and rules can be either case-sensitive (capital letters are not the same as lower case letters) or not case-sensitive (capital letters are equivalent to lower case letters). Additionally, "wildcards" can be used to represent single or multiple words or characters, lists of alternative characters or words can be used, variables can be used, proximity identifiers can be used (e.g., to identify that two words must occur without more than a particular number of other words in between them), repetitions can be used, etc. In one implementation, the grammar rules conform to the well-known regular expression handling patterns.

According to one implementation of the invention, the operators identified in Table I below can be used in the grammar rules. These operators are exemplary only—alternate embodiments of the invention can use different operators, additional operators, and/or fewer operators.

TABLE I

| Operator(s) | Description |
|---|---|
| [ ] | Optional items—any character(s) within the [ ] operators are optional (they can be used to match the rule to partial data input but are not required). |
| . . . | Wildcard—can be used to match any one or more input characters. A rule containing a wildcard is only matched if something else in the rule is also matched. When combined with the bracket operators (e.g., [. . .]), can be used to match any zero or more input characters. |
| % % | Variable—character(s) within the % % operators can match any group of one or more characters with no spaces. If the rule is presented to and accepted by the user, the group of characters is passed to the corresponding software module for processing. |
| % %+ | Variable—analogous to the % % operators, however the variable must match one or more groups of characters including spaces. |
| % %* | Variable—analogous to the % % operators, however the variable must match zero or more characters (spaces are okay). |

The following is an example of the use of wildcards and some of the operators in Table I. Assume that a grammar module includes the rules of Table II below and that the rules are not case-sensitive.

TABLE II

| Rule Number | Rule |
|---|---|
| 1 | [. . .] what time is it [. . .] |
| 2 | [. . .] tell me the time [. . .] |
| 3 | [. . .] what is the current time [. . .] |

Thus, using Table II, if the partial data input 218 were to be either "What" or "Computer, what", then the partial data input 218 would match rule numbers 1 and 3. However, if the partial data input 218 were to be "Computer, what t", then only the partial data input 218 would match only rule number 1.

Grammar 220 also includes history 232. History 232 includes multiple rules that were previously successfully matched to partial data inputs by system 210. A successful match is determined by user acceptance of the auto complete option 226 or an entry in suggestion list 228, as discussed in more detail below. Each successful match is added to history 232 by analysis module 212. Analysis module 212 may limit the number of entries that are added to history 232, or alternatively impose no limit on the number of entries.

Use of history 232 enhances the user-friendliness of system 210 by allowing system 210 to adapt to individual users. For example, assume that a user prefers to input all requests by addressing the computer, such as with the introduction "computer, ", and further assume that the grammar module includes only the rules "[ . . . ] what time is it", and "[ . . . ] tell me what time it is". If the user initially enters "computer, ", then neither rule is matched. However, by the time the user enters "computer, w", then the first of the two rules is matched. If the "what time is it" rule is used to complete the input for the auto complete option 226, then the auto complete option would be "computer, what time is it". If the user accepts this auto complete option then analysis module 212 adds the rule "computer, what time is it" to history 232. Thus, the next time the user requests the time, as soon as he or she enters "c", neither of the rules in the grammar module are matched but the "computer, what time is it" rule in history 232 is matched. Thus, the "computer, what time is it" rule can be used to auto complete the data input.

The rules in grammar 220 can include variables in addition to wildcards. Variables are similar to wildcards in that they can be matched by any user input (e.g., characters, words, spaces, etc. depending on the rule). However, the actual data that is input by the user that "matches" the variable is communicated to the corresponding software module for processing. For example, using the operators of Table II above, a rule in grammar module 230 may be "open % document %+", where "% document %" is the variable. So, if the user enters as partial data input 218 "open my resume", then analysis module 212 would match "my resume" to "% document %+", and forward "my resume" to the appropriate software module for processing (e.g., for the software module to open the file "my resume").

In the event that an accepted auto complete option is generated based on a match to a rule including wildcards or variables, then the data matching the wildcards or variables is included in the rule added to history 232. The matching data can be displayed the same as the remainder of the rule, or alternatively differently (e.g., italicized). For example, if a rule in grammar module 230 were "what is % symbol %+ trading at", and if the user entered the data input "what is Microsoft trading", then analysis module 212 would indicate that the rule matches the partial data input, with "% symbol %+" matching "Microsoft". If the matching rule were accepted by the user, then the rule "what is Microsoft trading at" would be included in history 232.

Analysis module 212 further limits the grammar modules 230 that it uses for matching rules to partial data inputs based on which software modules are executing on the computer at the time of the analysis. Each grammar module 230 corresponds to a particular software module as discussed above. In one implementation, each module adds its corresponding grammar module to grammar 220 when it begins execution, and then removes the grammar module when it closes or otherwise ends execution. Alternatively, grammar modules 230 may be added to grammar 220 once and remain there indefinitely regardless of whether the corresponding software module is executing. In such alternatives, analysis module 212 maintains a record of which grammar modules correspond to which software modules, and communicates with operating system 104 of FIG. 1 to receive a list of all currently executing software modules. Analysis module 212 can thus choose to ignore any grammar modules that correspond to software modules that are not currently executing.

Similarly, when analysis module 212 adds rules to history 232, analysis module 212 adds an indication of which grammar module 230 the match resulted from. Analysis module 212 can then similarly ignore, when performing its matching process, rules of history 232 that correspond to grammar modules that are either not loaded into grammar 220 at the time or that correspond to software modules that are not executing at the time.

Scoring module 214 generates a rank or score for each grammar rule of grammar 220 that analysis module 212 identifies as matching the partial data input 218. Scoring module 214 generates the score based on the number of matching words, the total number of words in the partial data input, and the total number of words (and/or variables) in the rule. According to one implementation, scoring module 214 uses the following formula to generate the score for a particular match:

$$((\text{match points}) \div (\text{rule words})) \times ((\text{match points}) \div (\text{input words})) \times 1000$$

where "match points" is the number of words (including word beginnings) in the partial data input that match words or variables in the rule, "rule words" is the combined number of words and variables in the rule, and "input words" is the number of words (including word beginnings) in the partial data input 218. optional characters and wildcards are not included in "match points", "rule words", or "input words" in this formulate. The formula results in a range of scores greater than zero and less than or equal to 1000.

Scoring module 214 determines the "match points" based on both the number of words (and word beginnings) in the partial data input that match words in the rule as well as variables in the rule. A match to a word is considered to be better than a match to a variable. So, if a word in the partial data input matches a word in the rule, then the value of 1.0 is added to "match points", whereas if a word in the partial data input matches a variable in the rule, then the value of 0.9 is added to "match points". So, if a partial data input matched three words and two variables of a rule, then the "match points" value for that rule would be 4.8.

By way of example, assume that the grammar includes two rules, "what is % anything %+" and "[ . . . ] open the document % document %+", and that the partial data input 218 is "what is o". The first rule matches the partial data input, with "% anything %+" matching the input "o". The second rule matches the partial data input, with [ . . . ] matching the input "what is", and the "o" of "open" matching the letter "o" in the input.

For the first rule, there are a total of three words and variables in the rule, there are three input words and word beginnings (the letter "o" being a word beginning), and there are two words and one variable of the rule that match the data input. So, the score for the first rule would be:

$$(2.9 \div 3) \times (2.9 \div 3) \times 1000 = 934$$

For the second rule, there are a total of four words and variables in the rule, there are three input words and word beginnings, and there is one word of the rule that matches the data input. So, the score for the second rule would be:

$$(1 \div 4) \times (1 \div 3) \times 1000 = 83.$$

Thus, in this example, the first rule has a higher score than the second rule, indicating that the first rule is a better match to the data input than the second rule.

Analysis module 212, or alternatively scoring module 214, can further modify the score for one or more of the rules matching the partial data input based on user context 222. User context 222 identifies, for example, the currently active application or software module on the computer, and optionally may include a record of how long that application or software module has been executing. This information is readily available from operating system 104 of FIG. 1 and can be maintained in user context 222 by analysis module 212 or other component (not shown) in system 210.

Analysis module 212 can use user context 222 to modify scores of the rules uniformly, such as adding a particular fixed amount or percentage to each matching rule from the grammar module corresponding to the currently active software module, or to a software module that has been executing for a long time. Alternatively, user context 222 may only be used as a "tie breaker", increasing the score of one rule if multiple rules otherwise result in the same score.

Once all of the matching rules are identified and scores generated, display module 216 selects the rule with the highest score and presents that rule as the auto completion option 226. Display module 216 also uses display threshold 224 to determine which other matching rules to include in suggestion list 228.

Display threshold 224 includes a threshold value that the score of a rule must exceed in order for the rule to be included in suggestion list 228. In one implementation, the threshold value is in the range of 125 to 175 (e.g., 150), although other values could be used. Alternatively, display threshold 224 may include a number of rules that are to be included rather than a score threshold. The number of rules may be an absolute value (e.g., ten), or alternatively a relative value (e.g., the highest scoring thirty percent of the matching entries).

Display module 216 can also be presented with the situation where a matching rule includes a variable for which no portion of the partial data input applies. For example, assume the grammar includes a rule "open the document % document %", and that the user types in "open the document". The rule matches the input, but there is no portion of the partial input that corresponds to "% document %". In such situations, display module 216 can display an indicator of the variable to inform the user that additional input needs to be provided. For example, display module may display "document" in the above example in a manner to distinguish it from the remainder of the partial data input (e.g., by italicizing "document").

Figure 5:
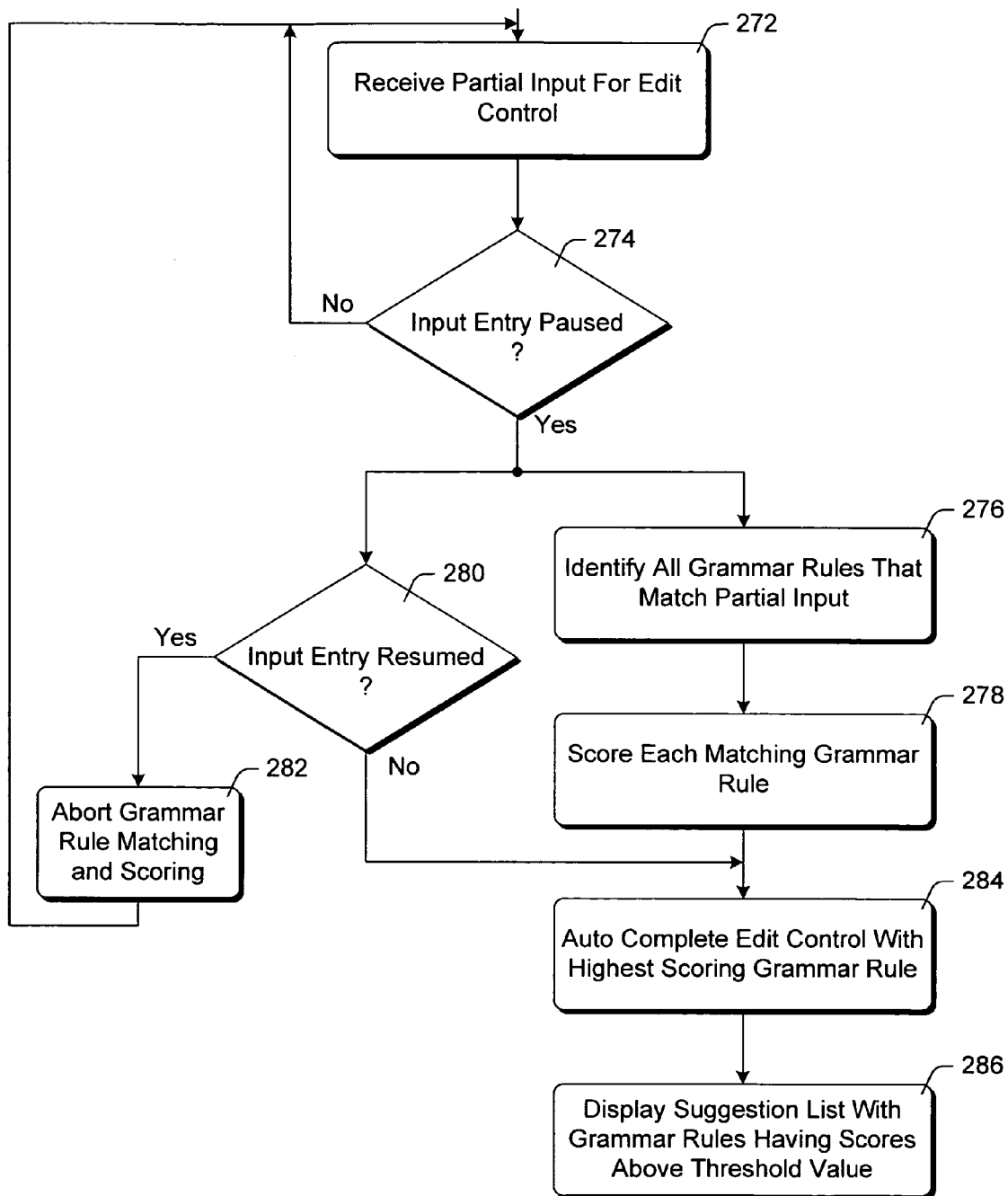
FIG. 5 shows exemplary steps in a process for auto completing and suggesting data entries according to one embodiment of the invention.

FIG. 5 shows exemplary steps in a process for auto completing and suggesting data entries according to one embodiment of the invention. The steps of FIG. 5 are carried out by system 210 of FIG. 3, and may be performed in software. FIG. 5 is described with additional reference to components in FIG. 3.

Initially, analysis module 212 receives a partial input for an edit control, step 272. Analysis module 212 waits until the user pauses during the input process, step 274. The duration of the pause can vary depending on whether data is being added or deleted, as discussed above.

Once the user pauses, analysis module 212 begins its analysis process, identifying all grammar rules that match the partial data input, step 276. Scoring module 214 then scores each of these rules, step 278. The scoring in step 278 could be done after the rules are identified in step 276, or alternatively concurrently with the rule identification in step 276.

Concurrently with the identification and scoring of steps 276 and 278, analysis module 212 checks whether the user resumes entering data, step 280. If the user resumes entering data before the identifying and scoring of steps 276 and 278 is completed, then analysis module 212 aborts the analysis process, step 282, and returns to receive the partial data input (step 272) and wait for a pause in the data entry (step 274).

However, if the identification and scoring of steps 276 and 278 is completed prior to the user resuming entering data, then display module 216 selects the matching grammar rule with the highest score to auto complete the data in the edit control, step 284. Display module 218 also selects the matching grammar rules with scores exceeding a threshold value and displays them in a suggestion list, step 286.

Conclusion

Thus, a grammar-based system and method for automatically completing a user entry and providing suggested completion options has been described. The user can advantageously be presented with a grammar-based automatic completion option, based on valid data inputs, that has been determined to have the highest likelihood of being what the user intended to request. Additionally, the user can advantageously be presented with additional grammar-based suggested completion options that are determined to have a relatively high likelihood of being what the user intended to request.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having stored thereon a computer program that, when executed by one or more processors, causes the one or more processors to perform acts including:
   receiving a partial data input for an edit control;
   comparing the partial data input to a plurality of grammar rules that identify valid inputs;
   identifying, based on the comparing, a set of grammar rules that match the partial data input;
   assigning a score to each of the grammar rules, the score indicating how closely the grammar rule matches the partial data input;
   displaying, as an automatic completion option, a grammar rule with a highest score; and
   displaying, as a list of suggested completion options, one or more grammar rules of the set of grammar rules with scores that exceed a threshold value.

2. One or more computer-readable media as recited in claim 1, wherein the assigning a score to each of the grammar rules further comprises accessing a user context of the partial data input and modifying the score of at least one of the grammar rules in accordance with the user context.

3. One or more computer-readable media as recited in claim 1, wherein the plurality of grammar rules conform to a Backus-Naur Form (BNF) format.

4. One or more computer-readable media as recited in claim 1, wherein the plurality of grammar rules are included in a plurality of grammar modules, and wherein each of the plurality of grammar modules includes grammar rules corresponding to a different software module that can be executed by the one or more processors.

5. One or more computer-readable media as recited in claim 4, wherein the comparing comprises comparing the partial data input to only the grammar rules in grammar modules corresponding to software modules that are currently executing.

6. One or more computer-readable media as recited in claim 1, wherein at least one of the plurality of grammar rules includes a variable.

7. One or more computer-readable media as recited in claim 1, wherein at least one of the plurality of grammar rules includes a wildcard.

8. One or more computer-readable media as recited in claim 1, wherein the plurality of grammar rules includes a set of grammar rules that were previously accepted by the user to complete a previous partial data input.

9. One or more computer-readable media as recited in claim 8, further comprising modifying one of the set of grammar rules by replacing any variables or wildcards in the grammar rule with matching portions of the previous partial data input.

10. A method comprising:
    receiving user input to an edit control of a user interface;
    comparing the user input to a plurality of rules that correspond to valid inputs;
    determining which of the plurality of rules is expected to have the highest likelihood of correctly completing the user input; and
    presenting the selected rule as an automatic completion option for the user input to the edit control.

11. A method as recited in claim 10, wherein the presenting comprises displaying at least a portion of the grammar rule in the edit control.

12. A method as recited in claim 10, wherein the receiving comprises receiving user input to an edit control of a graphical user interface.

13. A method as recited in claim 10, further comprising receiving a user acceptance of the selected rule as the user's desired input.

14. A method as recited in claim 10, further comprising receiving a user acceptance of only a portion of the selected rule as part of the user's desired input.

15. One or more computer-readable memories containing a computer program that is executable by a processor to perform the method recited in claim 10.

16. A method comprising:
    receiving user input to a user interface;
    comparing the user input to a plurality of rules that correspond to valid inputs;
    selecting a set of one or more rules from the plurality of rules, wherein the selecting comprises:
      generating a score for each of the plurality of rules that match the user input, and
      selecting rules with a score that exceeds a threshold value; and
    presenting the set of one or more rules as suggested completion options for the user input.

17. A method as recited in claim 16, wherein the presenting comprises presenting the set of one or more rules in alphabetical order.

18. A method as recited in claim 16, further comprising receiving a user selection of one of the suggested completion options as a completion of the user's input.

19. One or more computer-readable memories containing a computer program that is executable by a processor to perform the method recited in claim 16.

20. A system comprising:
    an analysis module to,
      receive a partial data input,
      generate, using a plurality of grammar rules, a set of options to complete the partial data input,
      associate a ranking with each option in the set of options; and
    a display module, coupled to the analysis module, to display at least a subset of the set of options.

21. A system as recited in claim 20, wherein the display module is to display a first option of the set of options in a same edit control as the partial data input is being presented, and to display a plurality of the subset of options in a suggestion list associated with the edit control.

22. A system as recited in claim 20, wherein the system further comprises a scoring module, coupled to the analysis module, to generate the ranking for each option in the set of options.

23. A system as recited in claim 20, wherein the display module is further to display at least a subset of the set of options by displaying the highest ranking options.

24. A user interface for accepting data input from a user, the user interface comprising:
- an edit control including a first portion in which data input received from a user is displayed, and a second portion in which auto completion data is displayed; and
- a suggestion list including at least one completion data option that is selected based on at least one rule corresponding to a valid input.

25. A user interface as recited in claim 24, wherein the second portion of the edit control abuts the first portion, so that the data input received from the user combined with the auto completion data results in a complete data entry.

26. A user interface as recited in claim 24, wherein the completion data in the second portion are displayed in an alphabetical ordering.

27. A user interface as recited in claim 24, wherein the suggestion list is displayed in response to a user request for the suggestion list.

28. A user interface as recited in claim 27, wherein the user request for the suggestion list comprises user selection of a pull-down menu button.

29. A user interface as recited in claim 24, wherein the auto completion data in the second portion is displayed in a manner to differentiate it from the data input in the first portion.

30. A user interface as recited in claim 29, wherein the auto completion data is highlighted and the data input is not highlighted.

31. A user interface as recited in claim 24, wherein the user interface comprises a graphical user interface.

32. One or more computer-readable media having stored thereon a computer program that, when executed by one or more processors, causes the one or more processors to perform acts including:
- receiving a partial data input for an edit control;
- waiting until the data input has paused for a first amount of time in the event data is being added to the edit control, and waiting until the data input has paused for a second amount of time in the event data is being deleted from the edit control; and
- analyzing, after completing the waiting, the partial data input to identify one of the plurality of grammar rules to automatically complete the data input and a set of the plurality of grammar rules to suggest as completion options.

* * * * *